May 9, 1933.  E. PRESTON ET AL  1,907,664
FLANGING MACHINE
Filed Oct. 27, 1930  2 Sheets-Sheet 1
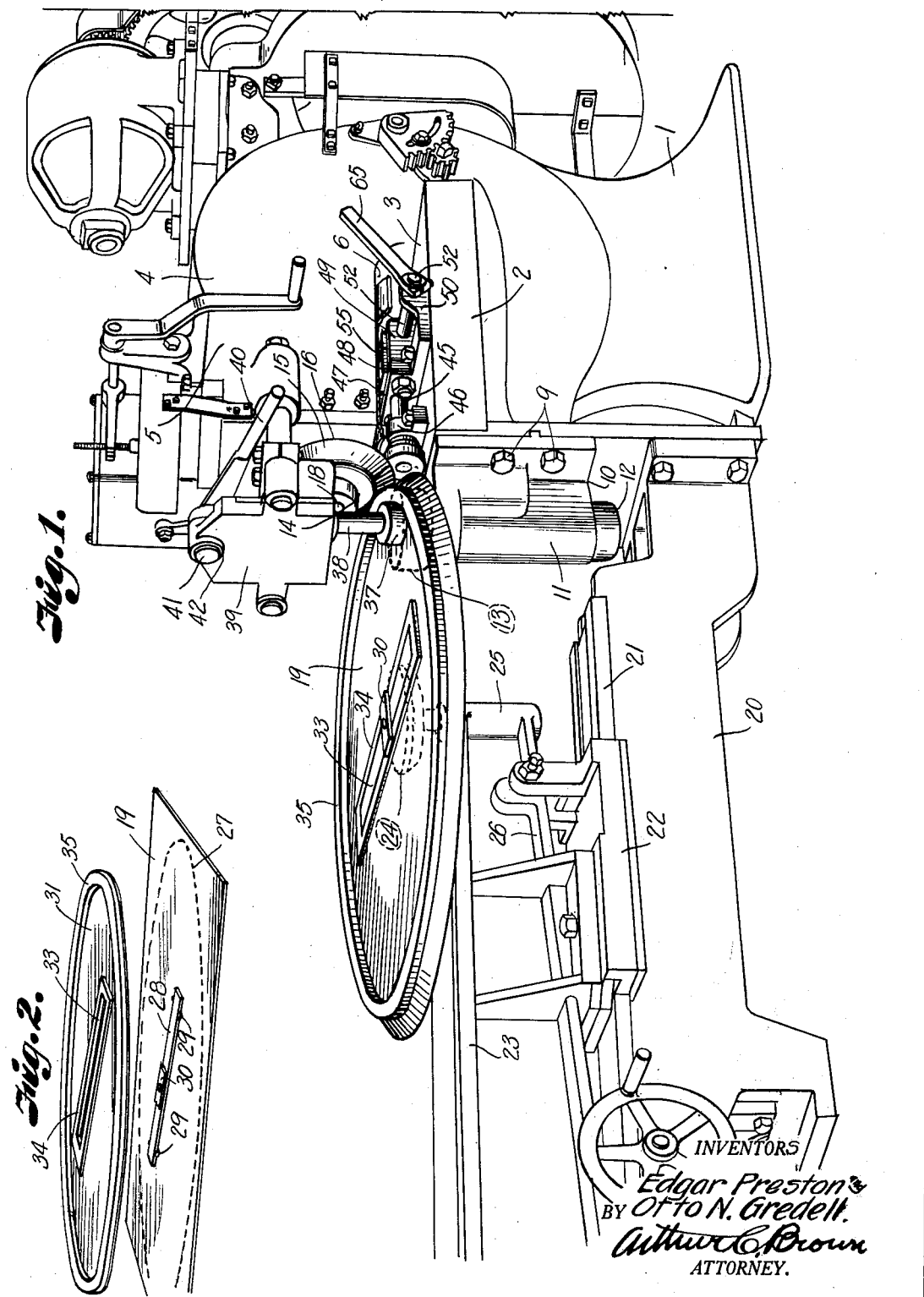

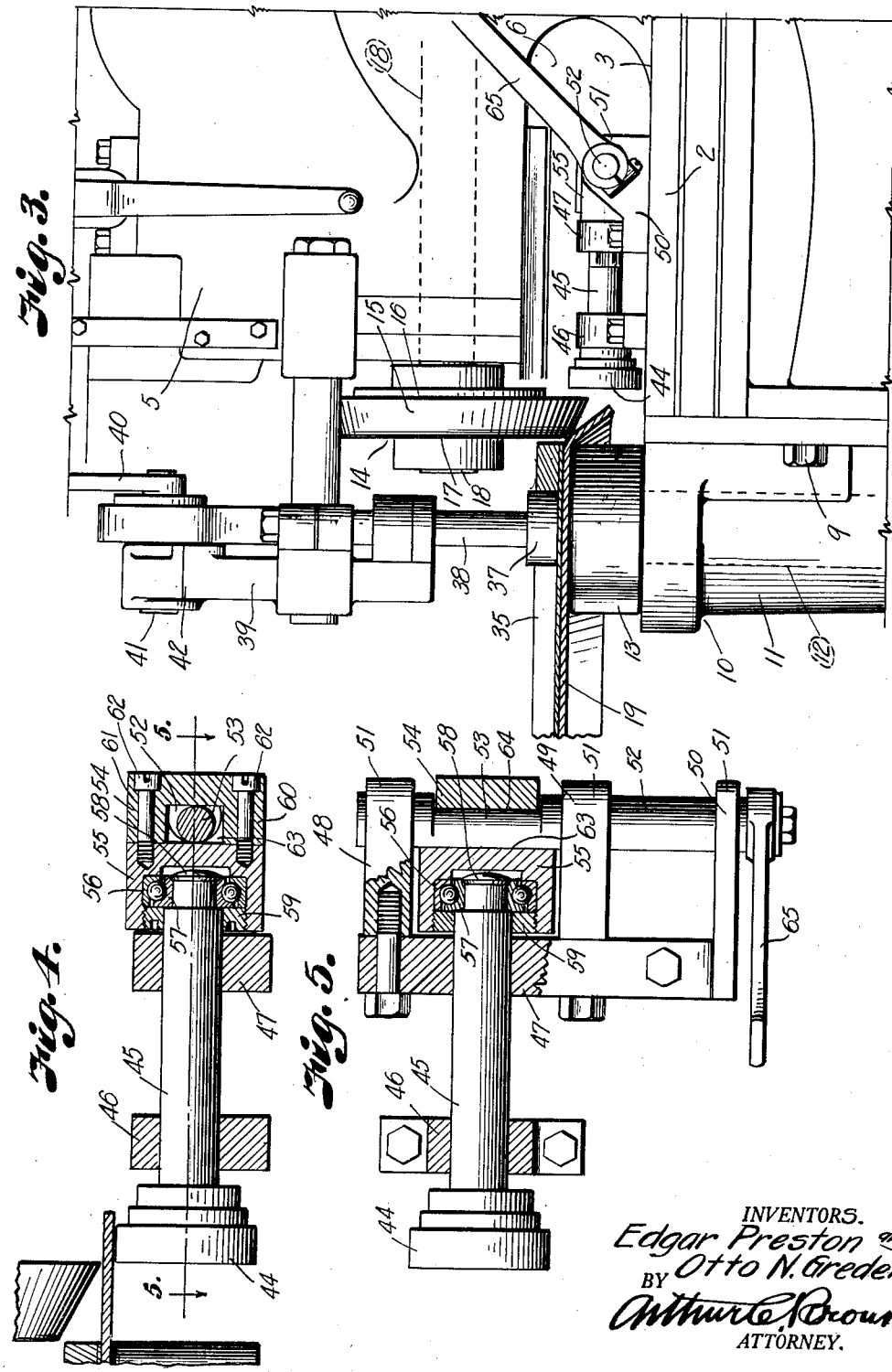

Patented May 9, 1933

1,907,664

UNITED STATES PATENT OFFICE

EDGAR PRESTON, OF NORTH KANSAS CITY, AND OTTO N. GREDELL, OF KANSAS CITY, MISSOURI, ASSIGNORS TO STANDARD STEEL WORKS, OF NORTH KANSAS CITY, MISSOURI, A CORPORATION OF MISSOURI

FLANGING MACHINE

Application filed October 27, 1930. Serial No. 491,568.

This invention relates to machines for cutting and forming metal plates, and more particularly to a single machine adapted to both cut and form a plate into the desired shape.

Machines for performing both these functions are quite cumbersome, and require a great number of moving parts. It is an important object of this invention to reduce the number of moving parts of such a machine, making the machine both easier of production and simpler of operation.

It is a further object of this invention to construct a machine that will cut a plate and flange the edge of the plate in one operation and which is equally well adapted to perform this function on various shapes of plates without the necessity of extensive changes in the machine.

In terms of broad inclusion the invention contemplates constructing a form to correspond with the shape of the finished plate, with an upstanding flange attached to the form, said flange having an interior periphery parallel to the edge of the finished plate and an outer periphery corresponding to the said edge, having the plate movable and having the drive member for the plate contact the inner periphery of the flange while the forming and cutting roller contacts the outer periphery thereof.

Other important features and objects of the invention will be apparent as the description proceeds.

In the accompanying drawings:

Fig. 1 is a perspective fragmentary view of a machine embodying our invention, part of a shield being broken away to better show a movable member cooperating with a flange turning disk to cut a blank.

Fig. 2 is a perspective view of a metal blank and a feeder disk shown spaced from the blank for providing a keeper flange whereby the blank may be held in operative relation with forming and cutting members.

Fig. 3 is a side elevation of the portion of the machine in which the edge portion of the blank moves while being formed, the blank and keeper disk being shown fragmentarily and in section.

Fig. 4 is a section through a reciprocating roll member, adjacent portions of a blank, keeper and die members being shown fragmentarily.

Fig. 5 is a section on the line 5—5, Fig. 4.

Referring in detail to the drawings:

1 designates a base, 2 a bed mounted on the base, and having a smooth upper surface 3, and 4 a superstructure rising from the base having an arm or head 5 projecting forwardly over the bed and spaced therefrom to provide a recess 6 for operating elements presently described, the whole comprising a frame for operating elements later described. Fixed to the vertical front face of the base by bolts 9 is a bracket or bearing 10 having a tubular portion 11 forming a vertical journal or channel for a rotative shaft 12 having an enlarged cylindrical head 13 comprising an anvil or die member which rests on and may rotate over the upper end face of the bearing member 10.

A forming and cutting member 14 comprising a disk or wheel comprising a flanging roller having substantial thickness and a peripheral edge face 15 tapering from a rear cutting edge 16 to the front or outer face 17 of the disk, as clearly shown in Fig. 1, is fixed to the outer end of a shaft 18 rotatably mounted in a support comprising a bearing box vertically movable in a guideway in the cutting head or neck of the frame. The mechanism is adapted to move the disk adjacent the periphery of the die member 13 to cut and/or turn a flange on a blank 19 (Fig. 2), having a peripheral portion supported by the anvil 13 as best shown in Fig. 3 and presently described. The disk support may include structure ordinarily provided for flanging machines for power operation to rotate the disk and move the bearing box, and is therefore not shown in detail.

Extending forwardly from the base beneath the die support 10 is a supplemental bed or frame 20 provided with a slide rail 21 on which a carriage 22 may move toward or away from the machine frame. A table-like blank support 23 is mounted on the carriage and extends substantially in registry with the face of the machine bed, and a disk 24 rotatively and vertically adjustably mounted on the arm 25 of a lever 26 pivotally supported by the carriage provides a support on which the blank may slide.

The drawings illustrate the blank 19, Fig. 2, rectangular, and dotted lines 27 thereon indicate the shape of the sheet of metal on which a flange is to be formed.

In order to retain the blank slidably supported on the bed in engagement with the forming disk, I attach a strip 28 to the blank across the midpoint of the design, preferably by welding indicated at 29, and mount a latching finger 30 rotatively on the strip, and provide a keeper plate 31 having a slot 33 to receive the strip whereby the plate may be mounted on the blank in face to face relation therewith, and the latching finger may be rotated over the upper face of the plate to latch the keeper to the blank.

Raised ribs or bosses 34 surrounding the slot form seats for the latching finger.

The plate 31 is provided with an upwardly extending flange or rib 35 at its edge, having outer and inner walls or peripheries conforming to the contour of the design represented by the dotted line, whereby a retaining roll or wheel 37 presently described, may hold the blank.

The roll 37 is mounted on the lower end of a shaft 38 rotatively mounted in a bracket or head 39 fixed to the neck of the frame, to engage the end face of the roll with the keeper plate and locate the cylindrical face of the roll in a position to receive the inner wall of the flange and form a stop, as well shown in Fig. 3. The outer wall of the flange is thus held to move in a path adjacent the outer face 17 of the disk 14, whereby the portion of the blank which projects beyond the keeper flange will move beneath the forming disk under frictional engagement of the disk with the blank.

The roll 37 is moved toward and away from the die 13 by a lever 40 pivoted to the frame neck and having a crank arm 41 operating in an eccentric yoke 42 on the bracket 39.

The axes of the roll 37 and shaft 38 are aligned with the transverse diameter of the die 13 but offset laterally from the diameter of the die that extends on the longitudinal axis of the machine, and thus offset laterally from the axis of the disk and disk-supporting shaft, as best shown in Fig. 1. The roll thus does not engage a point on the inner wall of the flange opposite the vertical diameter of the forming disk, thus avoiding tendency of the blank to pivot and move while being operated on, as would occur if the flange were pinched between the disk and the roll.

Reciprocable longitudinally of the machine toward and away from the die member 13 is a backing member or head 44, comprising a roll on the outer or front end of a shaft 45 slidable and rotative in spaced bearings 46 and 47 fixed to the bed by appropriate fastening means such as bolts, the roll being adapted to form a cutting edge to cooperate with the cutting edge of the forming disk 14 as shown in Fig. 4, to back up the blank and enable the cutting edge 16 of the disk to sever fragments from the blank and thus provide a blank having a desired outline or periphery.

The rear bearing 47 extends laterally to the edge of the bed, and has rearwardly extending arms 48, 49 and 50 provided with bearing portions 51 for a shaft 52, having a cam-like cylindrical portion 53 of reduced diameter offset from the axis of the shaft and operating on the rear end of the shaft 45 for reciprocating the roll 44 toward and away from the die member 13.

The shaft portion 53 as shown in Figs. 4 and 5, operates in a yoke-like member 54 fixed to the rear side of a block 55 having a forwardly presented recess into which the reduced end of the shaft 45 extends. A ball race 56 mounted in a groove in the recess, and a race ring 57 fixed to the reduced end of the shaft, hold balls to provide bearings in which the shaft end rotates, a swaged head 58 on the shaft engaging the race ring, and a ring 59 threadedly fixed in the outer end of the recess retaining the race ring.

Attention is called to the yoke member 54 which preferably comprises a U-shaped member including arms 60 and 61 having end faces engaging the rear face of the block 55 and fixed thereto by stud bolts 62, the arms being spaced a distance substantially equal to the diameter of the shaft 52 to form the shaft-receiving opening or recess 63. The length of the arms is limited to space the bottom 64 of the recess from the rear face of the block 55 a distance substantially equal to the diameter of the cam portion 53 of the shaft 52, whereby the cam may move vertically in the recess upon rotation of the shaft, but will bear against either the bottom 64 or the rear face of the block.

A crank 65 exterior to the machine is provided for operating the shaft to shift the backing member.

In using the invention, a keeper plate may be provided having a flange conforming to the outline or periphery of a blank when the blank is flanged, and may be mounted on a blank in the manner indicated in Fig. 2. The dotted line on the blank represents the contour of the keeper flange and the blank is to be cut on a line spaced from the dotted line to provide the peripheral flange of the blank.

The blank and keeper flange secured together by the strip and tongue are then mounted on the circle disk, and the carriage moved to locate the edge portion of the blank on the die member 13.

The roll 37 is then lowered to rest on the keeper plate and to engage the keeper flange, to hold the plates on the die member 13 and hold the blank for movement beneath the cutting disk.

The backing member is then shifted to the position shown in Fig. 4 wherein its end face is substantially aligned but spaced slightly away from the inner face of the disk.

The disk is then lowered to engage the blank and operated to sever the rim portion of the blank, the keeper and blank being moved rotatively due to rotation of the forming disk, and ability of the backing member, die 13 and keeper roll to rotate.

When the blank has moved beneath the forming disk sufficiently to complete the outline shape of the blank, the backing member is retracted and the forming disk is further depressed by slow increments through operation of the power mechanism. Rotation of the disk in frictional engagement with the projecting flange of the blank causes the blank to rotate, and the disk thus progressively bends and forms the peripheral portion of the blank into a flange as illustrated in Fig. 3.

Attention is called to the fact that the first effect of depression of the forming disk after the blank has been cut, is against the extreme margin of the projecting flange of the blank until the bevel of the disk is in face to face engagement with the upper face of the flange, at such point the flange having the appearance shown in Fig. 1.

Continued depression of the forming disk will operate against the inner portion of the blank adjacent the body of the plate and adjacent the die to bend the flange further and eventually the outer end face of the disk will move slidably over the inclined flange and thus press and form the flange against the cylindrical face of the die member 13.

The formed blank may be easily removed from the keeper plate, and the latching strip removed therefrom if desired.

Attention is called to the fact that the thickness of the flanging and cutting disk is substantially equal to the space between the anvil roller or die 13 and the cutting roll 44 when the latter is advanced, whereby the disk and roll 44 may form opposed cutting edges and the disk may move downwardly substantially in engagement with the front flat face of the roll. The roll 44 is however, preferably retracted after the cutting operation to avoid undue resistance to the slow downward flanging movement of the disk, which may effect several complete rotations of the plate and blank before the flanging operation is completed.

The cutting roll 44 is locked in either cutting or retracted position by reason of being on dead center in each of said positions, and the lever handle operates on the cam portion of the roll-reciprocating shaft as on the outer end of a crank to move the cam from dead center position.

What we claim and desire to secure by Letters Patent is:

1. In apparatus of the character described including a frame, means for supporting a blank on the frame, a flanging wheel having a cutting edge and means movable on the frame for supporting said flanging wheel, a cutting roll, a shaft rotatively supporting said cutting roll, and means including a yoke connected with the shaft for effecting reciprocation of the roll into and out of cooperative cutting relation with said flanging wheel.

2. In apparatus of the character described including a frame and means including an anvil for supporting a blank on the frame, a rotative flanging wheel having a bevel edge face forming a cutting edge, means movable vertically on the frame for supporting said wheel, a roll reciprocable on the frame into and out of cooperative cutting relation with said cutting edge, a shaft rotatively supporting said roll, spaced brackets supporting the shaft, and means including a yoke connected with the shaft for effecting reciprocation of the roll.

3. In apparatus of the character described, means for rotatively supporting a blank in horizontal position, a ring fixed to the blank, an anvil, means engageable with the inner face of said ring for controlling the path of movement of the periphery of the blank, movable means for supporting the peripheral portion of the blank, means for moving said movable means into and out of blank supporting position, and means operable successively for cutting and turning the peripheral portion of the blank.

4. In apparatus of the character described, a frame, an anvil roller rotatably mounted on the frame, a retaining roller cooperating with the anvil roller to retain a work sheet therebetween, a forming roller associated with the anvil roller and having a cutting edge, a cutting roller cooperating with the cutting edge of the forming roller to cut the periphery of the work sheet into shape, and means for moving the cutting roller away from the cutting edge of the forming roller to permit the forming roller to work the shaped edge of the work sheet over the anvil roller to form a flange on the work sheet.

5. In apparatus of the character described, a frame, an anvil roller rotatably mounted on the frame, a retaining roller cooperating with the anvil roller to retain a work sheet therebetween, a forming roller supported on the frame with its axis positioned at substantially right angles to the axis of the anvil roller and having a cutting edge, a cutting roller having its axis substantially parallel with the axis of the forming roller and cooperating with said cutting edge to cut the periphery of the work sheet into shape, and means for shifting the cutting roller away from the cutting edge of the forming roller to permit the forming roller to work the shaped edge of the work sheet over the anvil to form a flange on said work sheet.

6. In apparatus of the character described, a frame, an anvil roller rotatably mounted on the frame, a retaining roller cooperating with the anvil roller to retain a work sheet therebetween, a forming roller associated with the anvil roller and having a cutting edge, a cutting roller cooperating with the cutting edge of the forming roller to cut the periphery of the work sheet into shape, and means for locking the cutting roller in cutting position including means for moving the cutting roller away from the cutting edge of the forming roller to permit the forming roller to work the shaped edge of the work sheet over the anvil roller to form a flange on the work sheet.

7. In apparatus of the character described, a frame, an anvil roller rotatably mounted on the frame, a retaining roller cooperating with the anvil roller and having its axis offset to the axis of the anvil roller to retain a work sheet therebetween, a forming roller associated with the anvil roller and having a cutting edge, a cutting roller cooperating with the cutting edge of the forming roller to cut the periphery of the work sheet into shape, and means for moving the cutting roller away from the cutting edge of the forming roller to permit the forming roller to work the shaped edge of the work sheet over the anvil roller to form a flange on the work sheet.

In testimony whereof we affix our signatures.

EDGAR PRESTON.
OTTO N. GREDELL.